(12) United States Patent
Binder et al.

(10) Patent No.: US 8,499,448 B2
(45) Date of Patent: Aug. 6, 2013

(54) METHOD AND DEVICE FOR THE FINISH MACHINING OF COMPOSITE CAMSHAFTS AND ECCENTRIC SHAFTS

(75) Inventors: Thomas Binder, Feldkirch (AT); Ignaz Klaus Teppan, Goefis (AT)

(73) Assignee: ThyssenKrupp Presta TecCenter AG, Eschen (LI)

( * ) Notice: Subject to any disclaimer, the term of this patent is extended or adjusted under 35 U.S.C. 154(b) by 1096 days.

(21) Appl. No.: 12/280,333

(22) PCT Filed: Feb. 21, 2007

(86) PCT No.: PCT/EP2007/001479
§ 371 (c)(1),
(2), (4) Date: Feb. 3, 2009

(87) PCT Pub. No.: WO2007/096139
PCT Pub. Date: Aug. 30, 2007

(65) Prior Publication Data
US 2009/0223049 A1     Sep. 10, 2009

(30) Foreign Application Priority Data
Feb. 22, 2006   (DE) .......................... 10 2006 008 532

(51) Int. Cl.
*B21D 53/84*     (2006.01)
*B24B 1/00*      (2006.01)

(52) U.S. Cl.
USPC ............................... 29/888.1; 29/557; 451/62

(58) Field of Classification Search
USPC .............. 29/557, 558, 888.1; 74/567; 82/173; 123/90.6; 451/62
See application file for complete search history.

(56) References Cited

U.S. PATENT DOCUMENTS 1,937,999 A * 12/1933 Degrift et al. ................. 451/239
4,750,250 A *  6/1988 Maus et al. .................. 29/888.1
(Continued)

FOREIGN PATENT DOCUMENTS

DE      43 06 621 A1    9/1994
EP      153 880 A2      9/1985
(Continued)

OTHER PUBLICATIONS

International Search Report dated May 27, 2007 with English translation (Eight (8) Pages).

*Primary Examiner* — Alexander P Taousakis
(74) *Attorney, Agent, or Firm* — Crowell & Moring LLP

(57) ABSTRACT

The invention relates to a method of producing a composite shaft comprising a shaft body (1), at least one first component (2, 9) connected to the shaft body (1) in a rotationally fixed manner, and at least one second component (3, 8) rotatable relative to the shaft body (1), in which method the at least one first component (2, 9) and the at least one second component (3, 8) are pushed onto the shaft body and assembled in the intended sequence. In order to be able to produce such shafts in a simpler and more cost-effective manner and in order to be able to finish-machine the components connected to the shaft body (1) in a rotationally fixed manner only after the complete assembly of the composite shaft, it is proposed according to the invention that at least the first component (2, 9) connected to the shaft body (1) in a rotationally fixed manner be subjected to a machining operation and that the at least one second component (3, 8) be screened from the at least one first component (2, 9) during this machining in such a way that chips produced during the machining of the first component (2, 9) do not penetrate into the space between the second component (3, 8) and the shaft body (1) or between the second component (3, 8) and a third component (21) connected to the shaft body (1) in a rotationally fixed manner.

6 Claims, 9 Drawing Sheets

U.S. PATENT DOCUMENTS

| | | | | |
|---|---|---|---|---|
| 4,947,547 A | * | 8/1990 | Matt | 29/888.1 |
| 5,826,461 A | * | 10/1998 | Kaywood et al. | 74/567 |
| 5,868,042 A | * | 2/1999 | Swars | 74/567 |
| 6,149,503 A | * | 11/2000 | Laycock | 451/49 |
| 6,485,353 B1 | | 11/2002 | Laycock et al. | |
| 6,725,818 B2 | * | 4/2004 | Methley | 123/90.27 |

FOREIGN PATENT DOCUMENTS

| | | |
|---|---|---|
| EP | 1 362 986 A1 | 11/2003 |
| GB | 2 324 487 A | 10/1998 |
| GB | 2 338 667 A | 12/1999 |

* cited by examiner

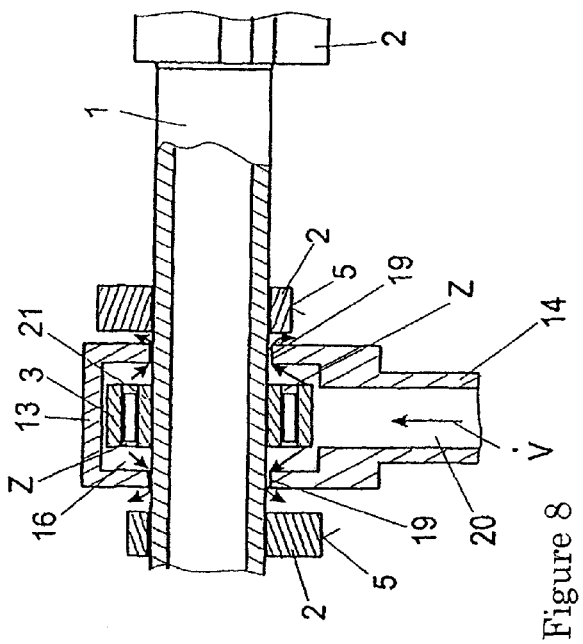
Figure 8
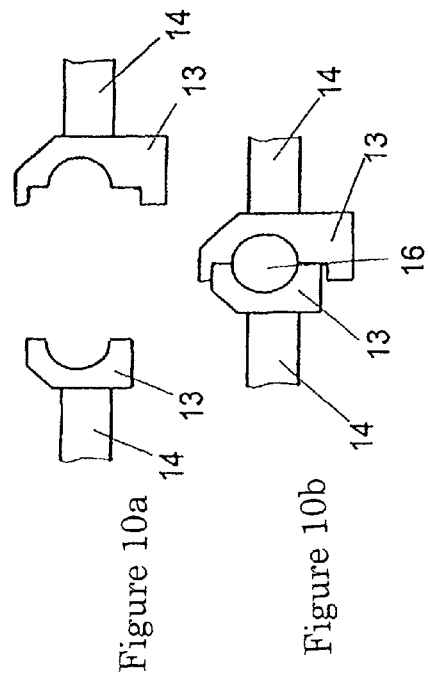
Figure 10a
Figure 10b
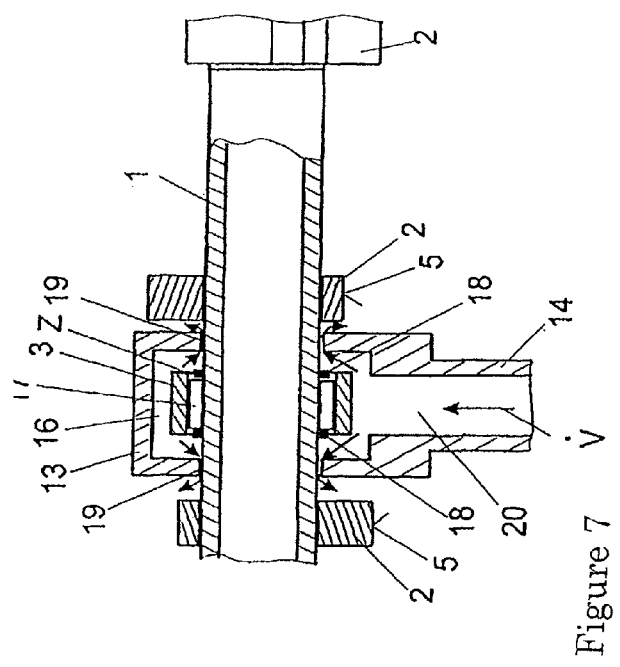
Figure 7
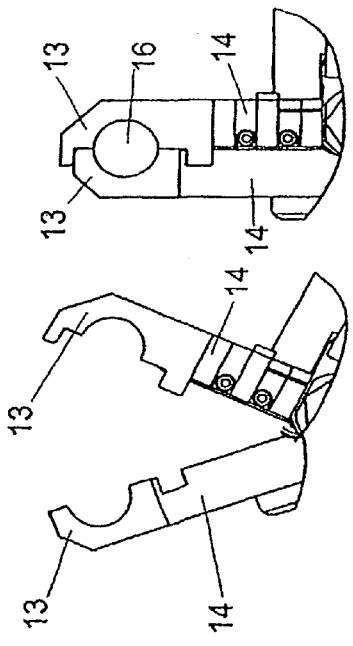
Figure 9a
Figure 9b

METHOD AND DEVICE FOR THE FINISH MACHINING OF COMPOSITE CAMSHAFTS AND ECCENTRIC SHAFTS

The invention relates to a method for producing a built-up shaft which includes a shaft body, at least one first component non-rotatably connected to the shaft body and at least one second component which is able to rotate relative to the shaft body. The invention also relates to a device for finishing such shafts.

The invention also relates to a cam shaft comprising a shaft body, a cam which is non-rotatably connected to the shaft body and which is ground on its functional surface, a second component which is mounted so as to rotate in the axial direction on the shaft body directly or indirectly via a third component, wherein an intermediate space is provided between this second component and the shaft body or between this second component and the third component.

In the area of engine technology there is a constant need to provide for example cam shafts with mutually rotatable cams or cam shafts or other shafts, such as adjusting shafts for variable valve mechanisms of internal combustion engines, with eccentric discs and pre-mounted bearing elements. Both the mutually rotatable cams and the bearing elements are able to rotate relative to the shaft body of the shaft. The components non-rotatably connected to the shaft body such as for example the cams and the eccentric discs, but also the bearing elements, must fulfil very strict requirements in terms of precision so that they can correctly fulfil their function when the shaft is in the installed condition. Thus for example in the case of a cam shaft with mutually rotatable cams, the running surfaces thereof must be formed in a precise shape and with precise dimensions in terms of their shape and position in relation to the running surfaces of the non-rotatable cams and in relation to the shaft axis. In the case of built-up shafts with eccentric discs and premounted bearings the running surface of the eccentric discs and also of the bearing element, which can rotate with respect to the shaft body, must be aligned very precisely in terms of their shape and position relative to the shaft axis.

Examples of built-up cam shafts with mutually rotatable cams are to be found in the documents DE 43 06 621 C2 and EP 1 362 986 A1. An example of an adjusting shaft for a variable valve mechanism is to be found in EP 1 593 880 A1.

If the components which are non-rotatably connected to the shaft body are connected to the shaft body for example by joining processes in which at least portions of the shaft undergo plastic deformation, or a shrink connection is produced between the component and shaft body, components non-rotatably connected to the shaft may expand. Furthermore, undesirable changes in the contour of the functional surfaces of the components may occur. Such expansion or changes then make subsequent grinding of the components necessary. Using the example of a cam shaft with mutually rotatable cams it is clear in this respect from the document DE 43 06 621 C2 that such chip-removing machining, after the shaft is completely assembled, by grinding of the cams is extremely complicated and suitable devices for this purpose are not available. In order to avoid chip-removing machining of the cams after complete assembly of the cam shaft and in order to provide an inexpensive and simple method for producing a built-up cam shaft with mutually rotatable cams it is suggested in DE 43 06 621 C2 that the cams are finished, hardened and ground before assembly of the individual longitudinal portions to form an outer shaft, and that then the individual longitudinal portions with the fully finished cams are connected to each other. In the case of this type of procedure, however, it is not ensured that the precision requirements relating to the functional surfaces of the movable cams are actually fulfilled after assembly of the longitudinal portions to form the outer shaft. Thus assembly of the longitudinal portions can lead to inaccuracies outside the tolerance range. These inaccuracies also occur in a non-reproducible manner so that awkward individual subsequent machining of these assembled shafts which deviate from requirements is necessary. Furthermore, the dimensionally accurate finishing of all individual parts prior to assembly is very awkward and cost-intensive because for example the set-up and handling times associated with the machining are incurred for each individual part and are therefore repeatedly incurred.

The manufacturing method disclosed in EP 1 362 986 A1 corresponds essentially to the manufacturing method described in the above-mentioned DE 43 06 621 C2 so that in this respect the same disadvantages are encountered.

The object of the invention is to create a method and a device of the type mentioned in the introduction with which the shaft can be produced in fulfilment of the necessary precision requirements in a simpler and more cost-effective manner, and the object is also to create a cam shaft wherein components non-rotatably connected to the shaft body can be ground without detracting from the function of further components disposed in a rotatable manner on the cam shaft.

By reason of the above-mentioned extremely high precision requirements it would be desirable to finish at least the functional surfaces of the components which are non-rotatably connected to the shaft only after complete assembly of the built-up shaft, and in so doing to achieve the required accuracies on the finished shaft. This is where the invention applies. The invention provides a solution which allows the chip-removing finishing of at least the functional surfaces of the at least one first component, which is non-rotatably connected to the shaft, after complete assembly of the shaft, without the risk that the resulting chips will impair the function of the at least one second component which can be rotated relative to the shaft body.

In accordance with the invention provision is made that at least the first component non-rotatably connected to the shaft body is subjected to chip-removing machining only after complete assembly of the shaft and the at least one second component is at least partially shielded during this machining with respect to the at least one first component in order to keep away the chips resulting from the machining. This shielding is effected in accordance with the invention in such a way that chips produced during machining of the first component cannot enter the intermediate space provided between the second component, which can rotate relative to the shaft body, and the shaft body, or between the second component, which can rotate relative to the shaft body, and a third component, which is non-rotatably connected to the shaft body and cooperates with the second component. In this way the shielding ensures that no damaging chips can pass between the rotatable second component and a third component non-rotatably connected to the shaft body or between the rotatable second component and the shaft body itself.

In accordance with the invention it may be sufficient for the shielding just to be provided by disc-like shielding elements which are pressed against the second component thus forming a narrow annular gap with the surface of the shaft body in the region of the intermediate space which is provided between the second component, which can rotate relative to the shaft body, and the shaft body or a third component non-rotatably connected to this shaft body. In this way effective shielding of the intermediate space is achieved which prevents the entry of chips into the intermediate space. The surface of the shaft body is preferably ground so that the inner surface, facing the shaft body, of the disc-like shielding elements can be very precisely adapted to the shaft body. In this way a very small annular gap between the shaft body and the shielding elements can be set, which effectively prevents chips from passing through.

In a preferred embodiment of the invention the shielding is achieved by encapsulating the second component which can rotate relative to the shaft body. In this way this second component is surrounded by a capsule in such a way that a cavity is provided between the second component and the capsule and an annular gap is provided between the capsule and the shaft body. The encapsulating of the second component prevents the entry of chips into the intermediate space between the second component and the shaft body or between the second component and the third component non-rotatably connected to the shaft body.

In order to ensure that absolutely no chips can pass through the annular gap formed between the capsule and the shaft body and therefore into the intermediate space between the second component and the shaft body or the third component non-rotatably connected to the shaft body provision is made in accordance with the invention in a preferred embodiment that the cavity formed between the capsule and the second component has a fluid flowing through it from the inside to the outside during the chip-removing machining of the first component. This fluid is preferably introduced under pressure into the cavity so that it flows through the cavity from the inside to the outside and escapes via the annular gap and in so doing constantly prevents the entry of chips from the outside through the annular gap.

The fluid used for the stated purpose can at the same time advantageously be used to cool the first component during the chip-removing machining process. The fluid can be gaseous or liquid. Thus it may be for example air or oil or a cooling liquid as used in a known manner in chip-removing machining processes such as for example grinding.

In accordance with the invention provision is made that shielding elements formed in at least two pieces are provided which can be brought from an open position into a closed position in which they shield the intermediate space, which is provided between the second component and the shaft body or between the second component and a third component non-rotatably connected to the shaft body, with respect to the first component during chip-removing machining in such a way that no chips resulting from the chip-removing machining can enter the intermediate space.

In a particularly simple embodiment of the invention the shielding elements are formed by covering discs which are formed as half rings and which are held by holding arms and can be pressed by these holding arms against the second component in the region of the intermediate space which is provided between the second component and the shaft body or a third component non-rotatably connected to the shaft body. It has been shown that even by these simple measures the intermediate space can be effectively shielded against chips produced during the chip-removing machining of the first component.

In a preferred embodiment of the invention the shielding elements comprise half shells which are held by holding arms and which form a capsule in the closed position, by means of which the second component, which can rotate relative to the shaft body, can be enclosed during the chip-removing machining process in such a way that a cavity is provided between the second component and the capsule and an annular gap is provided between the half shells and the shaft body.

The size of the annular gap is dependent on the one hand on the chip-removal process and on the other hand on the material to be removed. The smaller the annular gap the better the shielding effect. The demands of the dimensional stability of the components increase as the annular gap decreases. Annular gaps in the range of 0.1 mm to 0.4 mm with gap widths of 2 mm to 5 mm have proved effective. Larger gap widths and also smaller annular gaps lead to better sealing but also bring problems in terms of installation space and the above-mentioned tolerance problems.

In order effectively to prevent the entry of chips during the chip-removing machining of the first component a duct is provided in at least one of two mutually allocated holding arms, through which a fluid can be introduced under pressure into the cavity. In this way the cavity can be subjected by the fluid to negative pressure which reliably prevents chips from entering the cavity via the annular gap.

The second component which can rotate relative to the shaft body is formed for example as a bearing element, by means of which the shaft is rotatably mounted when in use. The bearing element can be formed as a bearing shell mounted directly via roller bodies on the—preferably ground—surface of the shaft body. As an alternative to this the bearing element can also be formed as an outer ring of a roller bearing so that the bearing element is mounted in the form of a bearing ring via roller bodies on a third component which is non-rotatably connected to the shaft body. Alternatively the bearing element can in turn be formed as a bearing sleeve which forms a slide bearing with the surface of the shaft body or with the surface of a third component non-rotatably connected to the shaft body.

In accordance with the invention the second component, which can rotate relative to the shaft body, can also be formed as a cam arrangement which can rotate with respect to the cams which are non-rotatably connected to the shaft body, as described for example in the documents EP 1 362 986 A1 and DE 43 06 621 C2. A hollow outer shaft is in this case provided as a shaft body with which certain first cams are non-rotatably connected. Furthermore, other second cams, which can rotate with respect to the non-rotatable first cams, are provided on the hollow shaft body and are disposed on a sleeve which can rotate with respect to the shaft body. This sleeve is non-rotatably connected to an inner shaft, which is axially guided through the hollow shaft body, by a pin-like fastening element which passes radially through the hollow shaft body. The inner shaft can be rotated relative to the hollow shaft body. An elongate hole extending in the peripheral direction of the hollow shaft body is disposed in this body and permits relative rotation of the sleeve and therefore of the second cam with respect to the hollow shaft body and therefore with respect to the first cam. In the case of such cam shafts with non-rotatable first cams and second cams which can rotate with respect thereto an intermediate space is provided between the sleeves, which support the rotatable second cams, and the hollow shaft body, into which space no chips may enter when the rotatable first cam is subjected to chip-removing final machining after complete assembly of the shaft. The shielding in accordance with the invention can in these cases be used in a manner fully analogous to the cases in which the component which can rotate relative to the shaft body is formed as a bearing element for mounting the shaft.

The cam shaft in accordance with the invention is based on the fact that the cam and the second component are positioned on the shaft body before the cams are ground, and, by reason of a covering element which covers the intermediate space during the grinding operation, the intermediate space is free from grinding chips from the cam. If there were chips in the intermediate space damage would be caused on the surfaces in the intermediate space during use of the cam shaft and would endanger prolonged operation of the rotatable components and therefore of the whole cam shaft. By avoiding the entry of chips as a result of the shielding, the rotatable component can fulfil its function over the long term and therefore has increased endurance over time.

The invention is described in more detail hereinunder with the aid of a drawing of an exemplified embodiment in which:

FIG. 7 shows an enlarged view of a closed shielding element in an axial half cross-section;

FIG. 8 shows an enlarged view of a closed shielding element in an axial half cross-section used in another embodiment of the shaft to be ground;

FIG. 9 shows a schematic view of an opened (FIG. 9a) and closed (FIG. 9b) shielding element in a side view to illustrate the closing movement;

FIG. 10 shows a schematic view of another embodiment of an opened (FIG. 10a) and closed (FIG. 10b) shielding element in a side view to illustrate an alternative closing movement;

The invention is explained with the aid of the specific example of an adjusting shaft for a variable valve mechanism. However, at this point reference is expressly made to the fact that a cam shaft is generally to be understood as a shaft with at least one cam, the cam being in contact with a cam follower. Rotation of the shaft causes the cam follower to be actuated according to the course or "program" embedded in the cam contour. In this way the term cam shaft also encompasses adjusting shafts for mechanical variable valve mechanisms. In this case the cams are formed as curved discs (for example eccentric discs) and are accordingly disposed on the shaft as adjusting discs.

Figure 1:
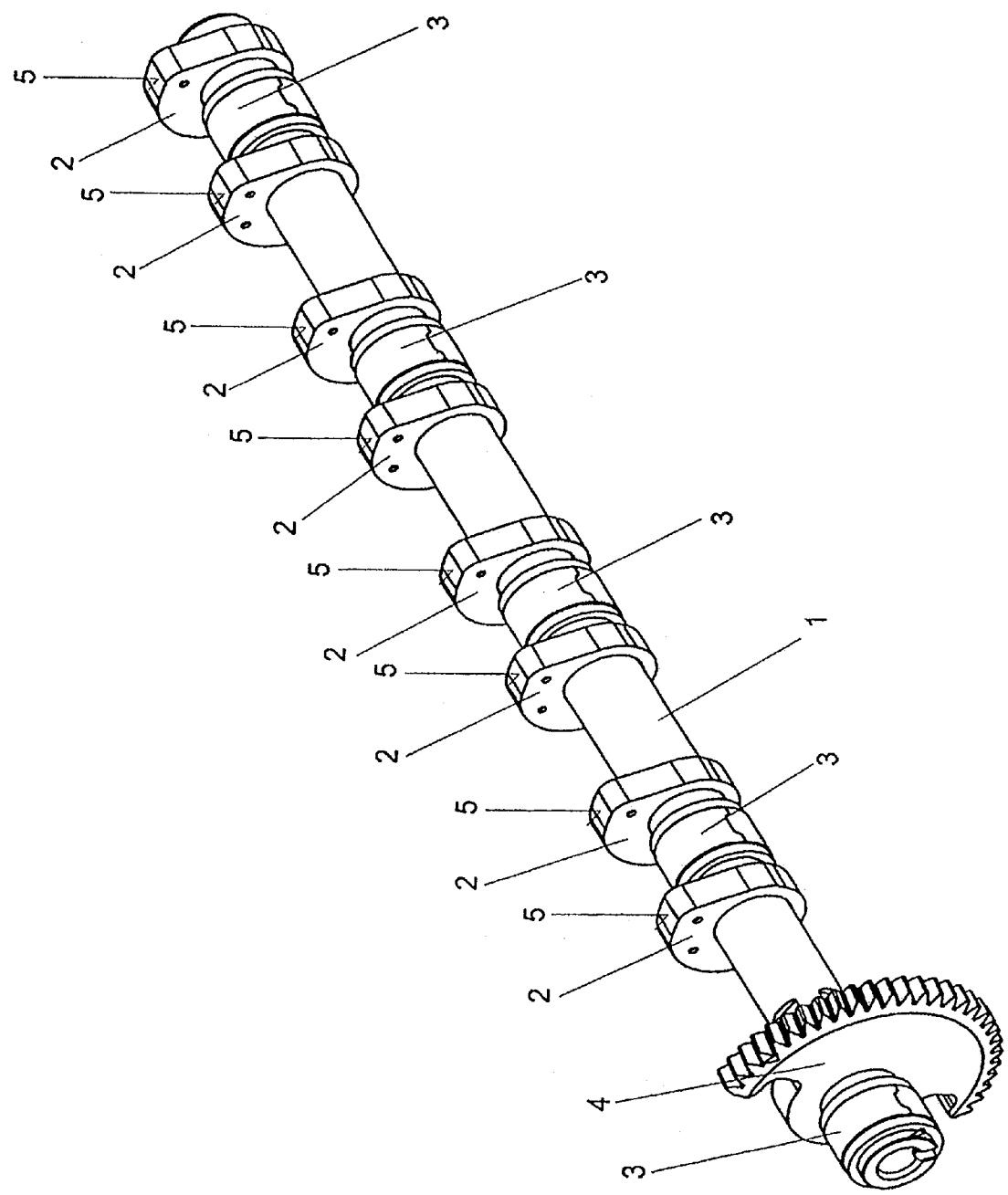
FIG. 1 shows a shaft in the form of an adjusting shaft in which the components which can rotate relative to the shaft body are formed as bearing elements disposed between the cams.

FIG. 1 illustrates an adjusting shaft comprising a shaft body 1. Cams 2 are disposed in a non-rotatable manner on the shaft body 1. In the illustrated exemplified embodiment the cams 2 are disposed in pairs. Between the cams 2 respective bearing elements 3 are disposed which can rotate relative to the shaft body 1. These bearing elements 3 are mounted directly on the surface of the shaft body 1 for example by means of roller bodies formed as needles. On the end of the adjusting shaft illustrated on the left in FIG. 1 a drive wheel 4 is disposed. A further bearing element 3 is provided next to the drive wheel 4 on the outer end of the shaft.

The cams 2 non-rotatably connected to the shaft body 1 have a functional surface 5 which cooperate in the installed condition with cam follower elements, not shown. In relation to the functional surfaces 5 definite high precision requirements must be fulfilled during production of the shaft. On the one hand the functional surfaces must be aligned very exactly with the longitudinal axis of the cam shaft. On the other hand the functional surfaces 5 must also be aligned very precisely relative to the surfaces of the bearing elements 3.

In accordance with the invention provision is made that the whole shaft as illustrated in FIG. 1 is first assembled completely before the chip-removing final machining of the shaft is then carried out, in which the precision requirements are then fulfilled. In particular in the framework of the chip-removing final machining of the shaft at least the above-mentioned functional surfaces 5 are subjected to a chip-removing finishing process, for example by grinding, in which chips are naturally produced.

Figure 2:
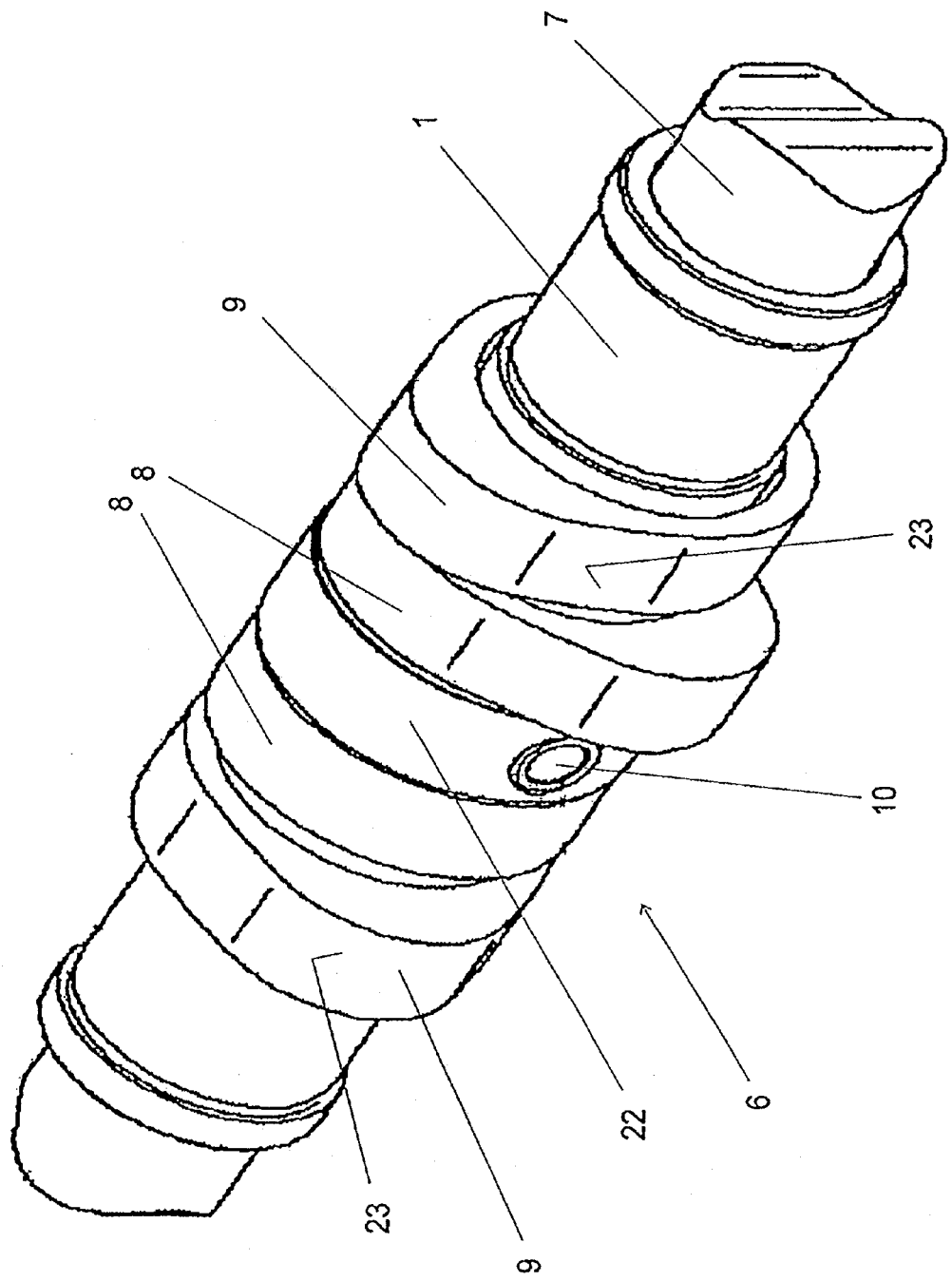
FIG. 2 shows an enlarged view of a portion of a cam shaft in which the components which can rotate relative to the shaft body are formed as rotatable cams.

The components which can rotate relative to the shaft body 1 and are designated as "second components" in the claims are illustrated as bearing elements 3 in the exemplified embodiment shown in FIG. 1. As shown in FIG. 2, these elements can also be formed as rotatable cam elements 6. The shaft body 1 is formed as a hollow shaft through which an inner shaft 7 is guided. With the aid of the inner shaft 7 the rotatable cams 8 can be rotated relative to the cams 9 which are non-rotatably connected to the shaft body 1 and have a functional surface 23. The rotatable cams 8 are mounted over the shaft body 1 via a support sleeve 22. With the aid of the fastening element 10, which can be formed for example as a pin, the rotatable cams 8 are non-rotatably connected to the inner shaft 7 via a support sleeve 22, and in the shaft body 1 formed as a hollow shaft an elongate hole extending in the peripheral direction is disposed and permits relative rotation of the rotatable cams 8 with respect to the cams 9 non-rotatably connected to the shaft body 1.

Figure 11:
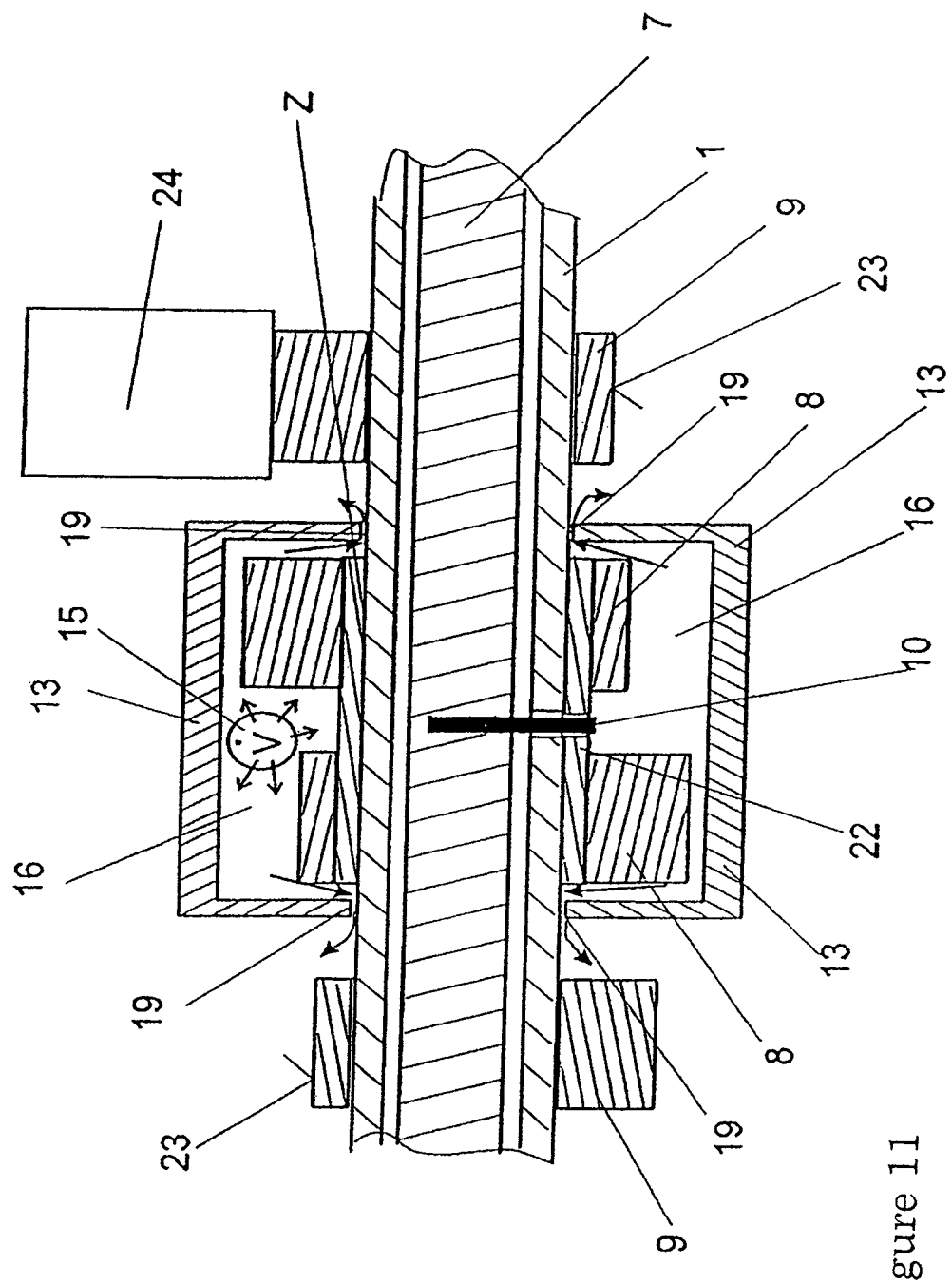
FIG. 11 shows an enlarged view of an example of a manner of covering the rotatable cams according to FIG. 2.

In FIG. 11 a cam shaft of this type is illustrated schematically in a cross-sectional view.

Figure 3:
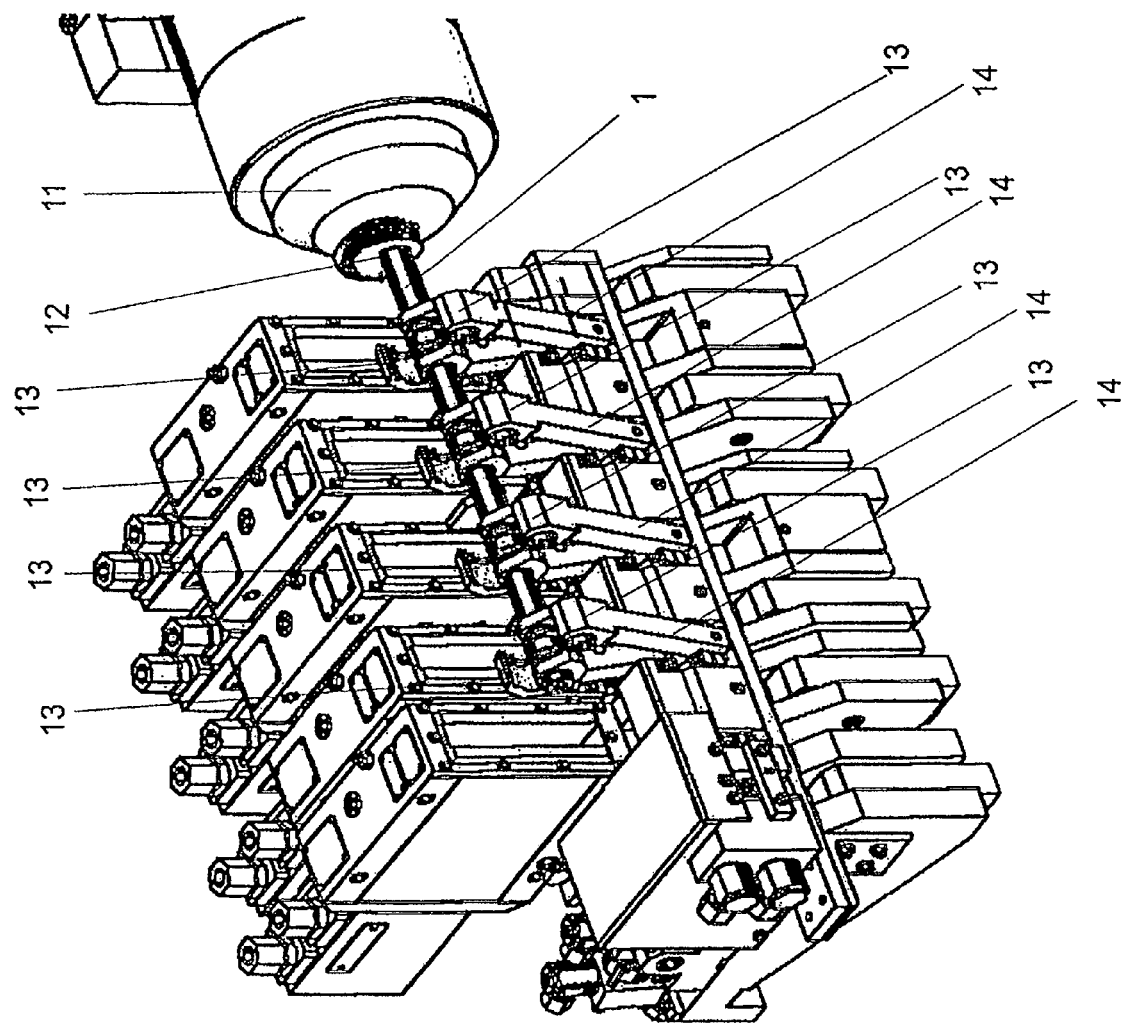
FIG. 3 shows an assembly drawing of the device in accordance with the invention with the shielding elements in the open position.

In the assembly drawing shown in FIG. 3 the device in accordance with the invention is illustrated in a perspective view. The device has a drive device 11 which drives a clamping device 12. With the aid of the clamping device 12 the shaft is clamped with the shaft body 1 so that the shaft body 1 can be made to rotate with the aid of the drive device 11. Furthermore, the device illustrated in FIG. 3 has shielding elements 13 which are disposed in pairs lying opposite each other. The shielding elements are formed as half shells which are shown in their open position in FIG. 3. The half shells are held by holding arms 14 and can be moved into a closed position with the aid of these holding arms.

Figure 4:
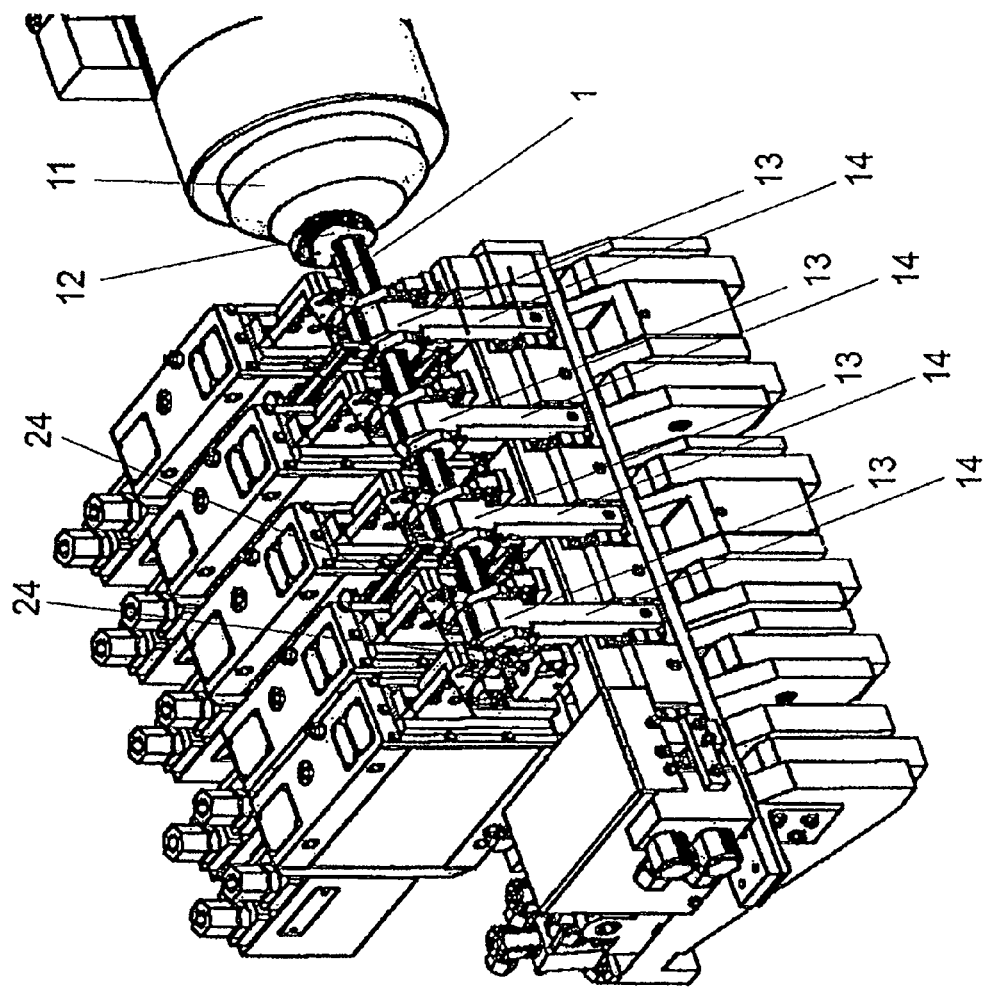
FIG. 4 shows an assembly drawing of the device in accordance with the invention with the shielding elements in their closed position.

FIG. 4 shows a device in accordance with FIG. 3, wherein the shielding elements 13 are shown in their closed position. In this position the shielding elements 14 encapsulate the components which are formed as bearing elements and can rotate relative to the shaft body 1. In the illustrated position the grinding discs 24 are engaged with a respective surface of an eccentric disc 2 for chip-removing machining purposes.

Figure 5:
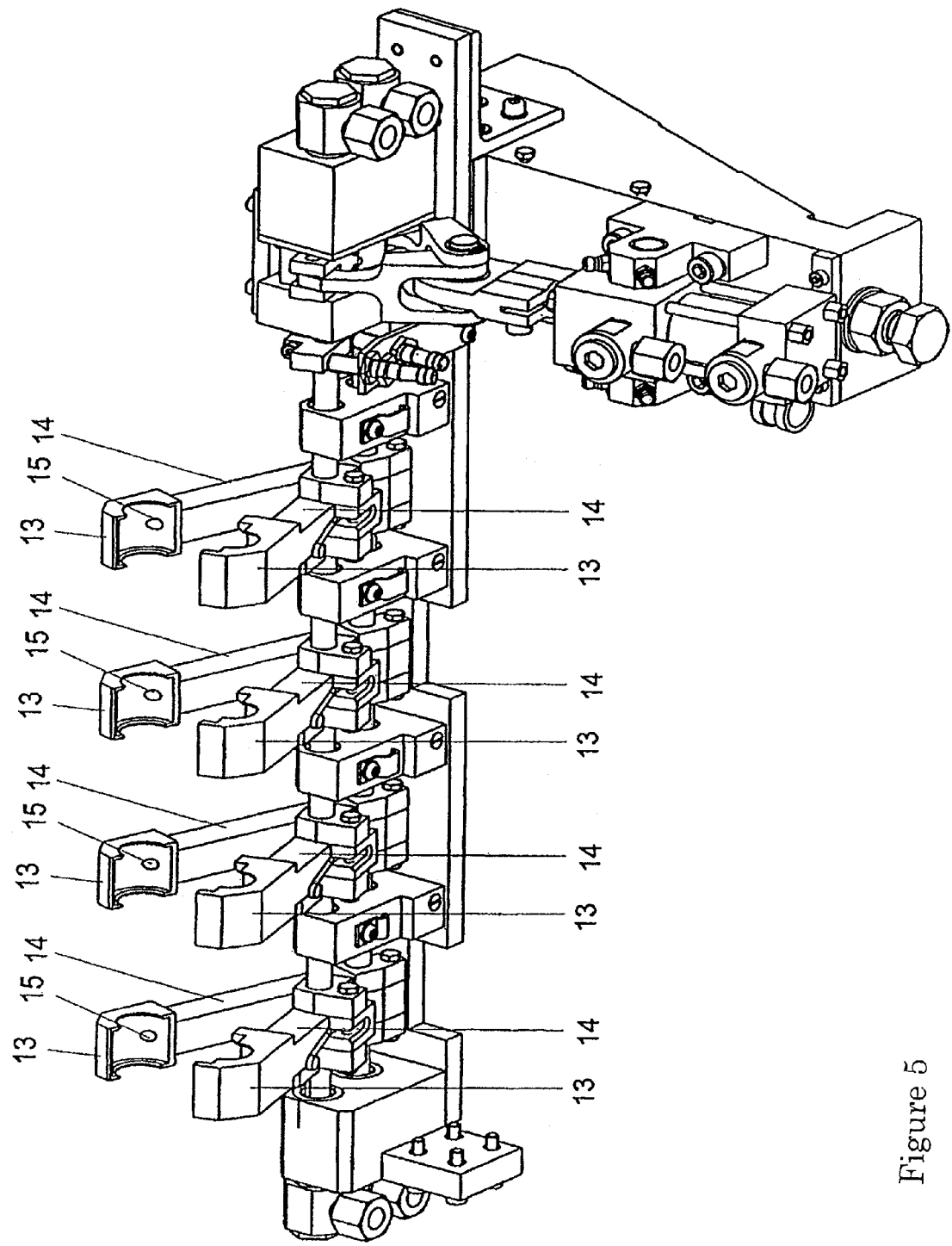
FIG. 5 shows an enlarged view of the shielding elements in the open position.

In FIG. 5 the device in accordance with the invention is shown in an enlarged and simplified manner. The shielding elements 13 formed as half shell-like capsule elements are disposed at the free end of holding arms 14 and shown in their open position. The holding arms 14 can be pivoted via fastening devices, not shown in more detail, about a bearing axis which extends through the base point of the holding arms 14 so that the shielding elements 13 can be moved towards each other and in the closed position form capsules enclosing portions of a shaft, not shown in FIG. 5. FIG. 5 shows that ducts 15 run through the holding arms 14 and issue into the half shell-like shielding elements. Through these ducts 15 the cavity, which is formed between the bearing element to be shielded and the shielding element in the closed condition, is supplied with a pressurised fluid which flows out of the cavity 16 from the inside towards the outside during chip-removing machining of the functional surfaces of the cams 2 and 9 (cf. FIG. 6).

The pivoting movement of the holding arms 14 to open and close the shielding elements 13 is shown in FIG. 9a and 9b. FIG. 9a shows the opened condition while FIG. 9b shows the closed condition.

Alternatively it is also feasible and possible to open or close the partial pieces of the shielding elements 13 by linear guidance of the holding arms 14. FIG. 10a and 10b show such an alternative. FIG. 10a shows the opened and FIG. 10b the closed condition of the shielding elements 13.

Figure 6:
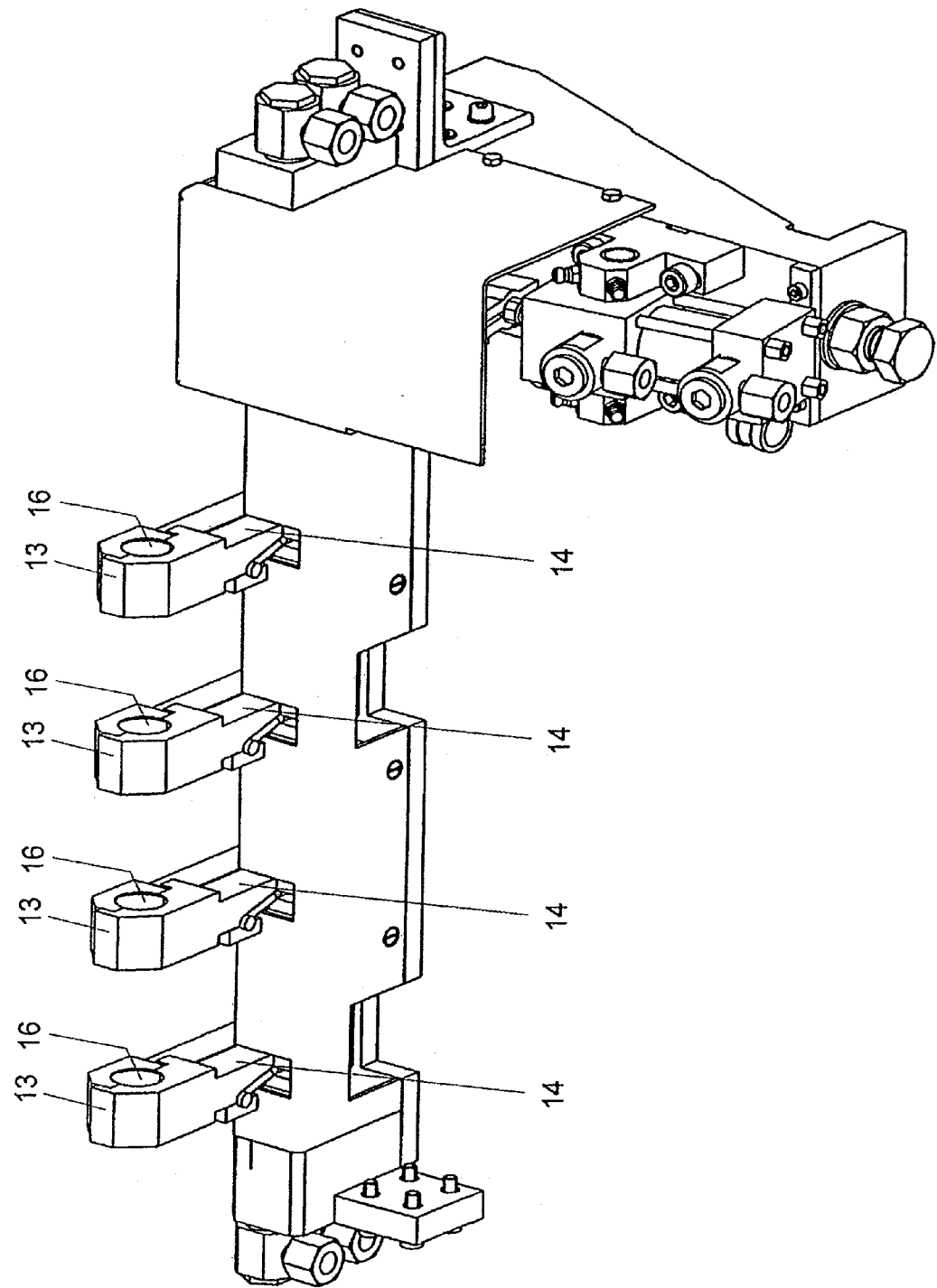
FIG. 6 shows an enlarged view of the shielding elements in the closed position.

FIG. 6 shows the device in accordance with FIG. 5, wherein the shielding elements 13 are in their closed position. In this closed position the shielding elements 13 form a cavity 16. In the case where the shaft is placed into the device this cavity 16 forms an annular cavity with this shaft, which cavity shields or encapsulates the bearing element, which is to be shielded, with respect to the cams which are to be subjected to chip-removing machining. By this encapsulation alone the entry of chips during chip-removing machining of the functional surfaces of the cams 2 and 9 is effectively prevented. In a particularly reliable manner the entry of chips into the intermediate spaces between the bearing element 3 and the shaft body 1 (cf. for example FIG. 1) can be prevented when the cavity 16 has pressurised fluid, for example air, oil or cooling liquid, flowing through it from the inside to the outside with a volume flow V during the chip-removing machining process. Media pressures of 6-26 bar have proved useful.

FIG. 7 shows an axial half cross-section through the device in accordance with the invention on an enlarged scale. In the exemplified embodiment illustrated in FIG. 7 cams or eccentric discs 2 are disposed on the shaft body 1 and are non-rotatably connected to the shaft body 1. The cams or eccentric discs 2 have functional surfaces 5 which, in the individual case, cooperate with cam followers or eccentric disc followers, not shown. A bearing element 3 in the form of an outer bearing shell is disposed on the shaft body 1 so as to rotate relative to the shaft body 1. The bearing element 3 is mounted via roller bodies 17 directly on the surface of the shaft body 1. By means of axial securing means 18, which for example can be formed as jump rings inserted into corresponding annular grooves in the shaft body 1, the bearing element 3 is axially fixed on the shaft body 1. In order to be able to machine the functional surfaces 5 of the cams or eccentric discs 2 in a chip-removing manner and to do so while fulfilling the high precision requirements placed on the shaft without risking chips entering the intermediate space Z between the bearing element 3 and the shaft body 1, a shielding element 13 formed as a half shell is provided which encloses, and therefore encapsulates, the bearing element 3 in the closed condition illustrated schematically in FIG. 7. A cavity 16 is formed between the bearing element 3 and the shielding element 13 and an open annular gap 19 is provided between the shielding element 13 and the surface of the shaft body 1. The shielding element 13 is disposed on a holding arm 14 which has a duct 20 extending in the axial direction of the holding arm 14. Through the duct 20 a volume flow V of a pressurised fluid can flow in the direction of the cavity 16. This is indicated by the arrow in FIG. 7. In this way the cavity 16 can have pressurised fluid flowing through it from the inside to the outside, while the chip-removing machining of the functional surfaces 5 of the cams or eccentric discs 2 is taking place. Through the volume flow of the fluid from the inside to the outside the passage of chips through the annular gap 19, and therefore the entry of chips into the intermediate space Z, can be effectively prevented. The fluid flows through the duct 20 into the cavity 16 and from there through the respective annular gap 19 to the surroundings. The arrows show the division of the volume flow V and the passage of the fluid through the annular gap 19.

At least in the region in which the roller bodies 17 roll on the surface of the shaft body 1 the shaft body is ground so that the surface quality is sufficiently high for mounting the bearing element 3 via the roller bodies. Alternatively the bearing element 3 can also be mounted via the roller bodies 17 on a bearing ring 21 shown in FIG. 8 which is non-rotatably connected to the shaft body 1. Similarly as an alternative to the embodiment shown in FIG. 7 the bearing element 3 can be formed as a bearing sleeve which forms a slide bearing with the surface of the shaft body 1. In this case the roller bodies 17 are not provided.

FIG. 11 shows a cross-sectional view of the grinding of a cam shaft corresponding to the embodiment as shown in FIG. 2. The shielding elements 13 are closed, a fluid with a volume flow V is supplied via a duct 15 and exits through the annular gap 19 as shown by the arrows. The cams 8 which can pivot with respect to the shaft 1 are attached to a support sleeve 22. The support sleeve 22 is non-rotatably connected to the inner shaft 7 via the pin 10. The support sleeve 22, however, is mounted on the shaft 1 in a rotatable manner. The chips produced during machining of the functional surfaces 23 of the cams 9 with the grinding disc 24 are prevented by the fluid flow from entering the intermediate space Z, in this case the slide bearing gap between the sleeve 22 and the shaft 1.

Figure 12:
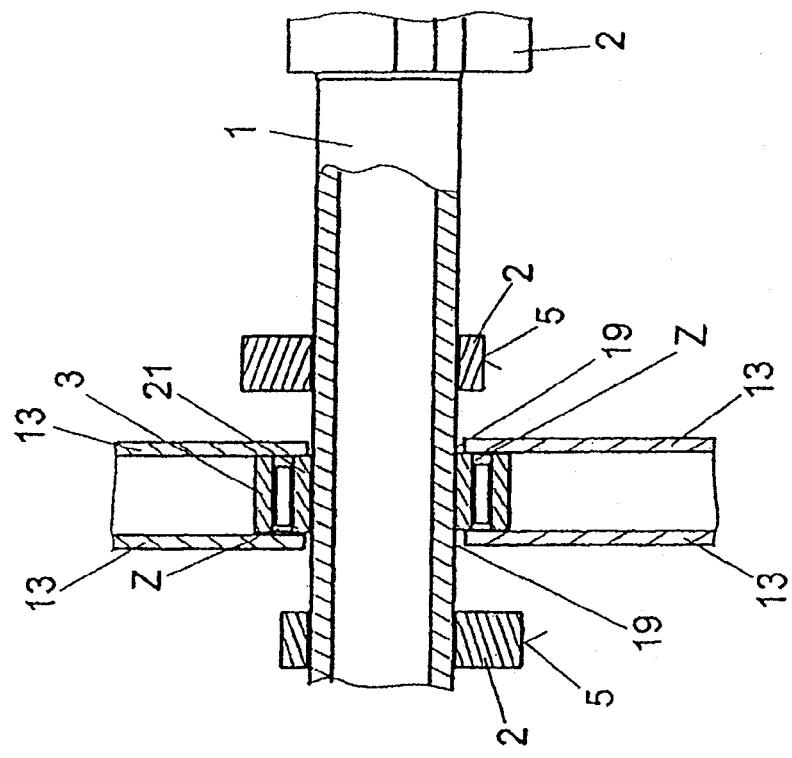
FIG. 12 shows an enlarged view of a pair of closed shielding elements which cover only the gap but not the whole rotatable component.

FIG. 12 illustrates a cross-sectional view of an alternative embodiment of the invention in which the intermediate space Z is covered by covering elements 13, so-called ring elements, without the whole second component 3, which can rotate relative to the shaft 1, being completely covered. In this way for example even the rotatable second component 3 could also be ground on its peripheral surface. By pressing the covering elements 13 against the axial side surfaces of the rotatable second components 3 they can be prevented from rotating during the mechanical machining process.

The invention presented herein offers a simple solution, which is suitable for mass production, for the mechanical and in particular grinding machining of shafts which support functional elements able to rotate about the shaft axis.

It is thus obvious that the embodiments shown in the examples can be combined or exchanged with each other. For example the solution shown in FIG. 12 for covering only the annular gaps can also be used for cam shafts in an embodiment corresponding to FIG. 2. At the same time all forms of covering elements can be formed in such a way that they can be opened or closed in a linear or pivotable manner. Combinations of types of covering elements and/or opening and closing techniques are also possible.

The covering of individual components on shafts during mechanical machining can naturally also be used for components which are not rotatably disposed on the shaft. This may be suggested for example for very sensitive components.

Figure 13:
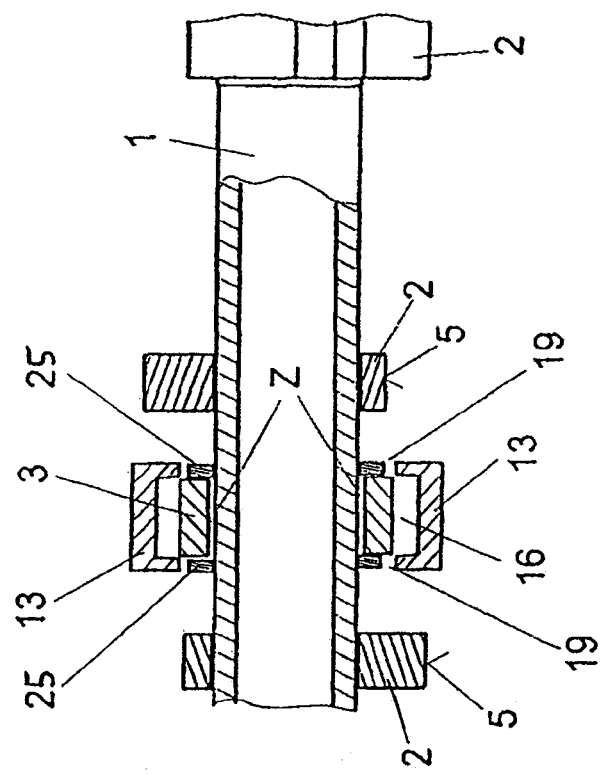
FIG. 13 shows an enlarged view of an embodiment in which the component which can rotate relative to the shaft body is held axially in position by fixing rings, wherein the shielding element cooperates with the fixing rings.

FIG. 13 shows an embodiment of the invention in which the component 3 which can rotate relative to the shaft body is held axially in position by two fixing rings 25 non-rotatably connected to the shaft body 1. The shielding element 13 is formed in two parts and has two half shells which cooperate with the fixing rings 25 and form an annular gap 19 therewith. The shielding elements 13 are formed with a U-shaped cross-section and form a shield for the bearing element 3 in such a way that on the one hand a cavity 16 is provided which annularly surrounds the bearing element 3 and on the other hand a narrow annular gap 19 is formed with each fixing ring 25 so that the intermediate space Z, which is formed in FIG. 13 between the bearing element 3 and the shaft body 1, is protected against the entry of chips produced during the chip-removing machining of the functional surfaces 5 of the cams 2.

By means of this arrangement the annular gap 19 is formed at a radial distance from the intermediate space Z, which leads to particularly effective shielding of the intermediate space Z. The fixing rings 25 form the fourth component mentioned in claim 2 in the exemplified embodiment of the invention illustrated in FIG. 13. The annular gap 19 is not formed with the outer surface of the shaft body 1 but with the respective outer surface of the fixing rings 25.

REFERENCE LIST 1 shaft body
2 cam, eccentric disc, first component
3 bearing element, second component
4 drive wheel
5 functional surface
6 cam element
7 inner shaft
8 cam, second component
9 cam, first component
10 fastening element
11 drive device
12 clamping device
13 shielding element, covering element
14 holding arm
15 duct
16 cavity
17 roller body
18 axial securing means
19 annular gap
20 duct
21 bearing ring, third component
22 support sleeve
23 functional surface
24 grinding disc
25 fixing ring, fourth component
V volume flow
Z intermediate space

The invention claimed is:

1. A method for producing a built-up shaft which includes a shaft body, the method comprising:
   connecting at least one first component non-rotatably the shaft body;
   connecting at least one second component to the shaft body so that the at least one second component is rotatable relative to the shaft body, wherein the at least one first component and the at least one second component are connected to the shaft body by being pushed onto and mounted on the shaft body in the preset sequence;
   subjecting at least the first component non-rotatably connected to the shaft body to chip-removing machining while shielding the at least one second component during this machining with respect to the at least one first component in such a way that chips produced during machining of the first component do not enter an intermediate space (Z) provided between the second component and the shaft body or between the second component and a third component non-rotatably connected to the shaft body.

2. A method for producing a built-up shaft which includes a shaft body, the method comprising:
   connecting at least one first component non-rotatably the shaft body;
   connecting at least one second component to the shaft body so that the at least one second component is rotatable relative to the shaft body, wherein the at least one first component and the at least one second component are connected to the shaft body by being pushed onto and mounted on the shaft body in the preset sequence;
   subjecting at least the first component non-rotatably connected to the shaft body to chip-removing machining while shielding the at least one second component during this machining with respect to the at least one first component in such a way that chips produced during machining of the first component do not enter an intermediate space (Z) provided between the second component and the shaft body or between the second component and a third component non-rotatably connected to the shaft body,
   wherein one or more intermediate spaces (Z) between the second component and the shaft body or the third component connected to the shaft body is/are covered by a cover during the chip-removing machining in such a way that an annular gap is provided between the cover and the shaft body or a fourth component non-rotatably connected to the shaft body.

3. A method for producing a built-up shaft which includes a shaft body, the method comprising:
   connecting at least one first component non-rotatably the shaft body;
   connecting at least one second component to the shaft body so that the at least one second component is rotatable relative to the shaft body, wherein the at least one first component and the at least one second component are connected to the shaft body by being pushed onto and mounted on the shaft body in the preset sequence;
   subjecting at least the first component non-rotatably connected to the shaft body to chip-removing machining while shielding the at least one second component during this machining with respect to the at least one first component in such a way that chips produced during machining of the first component do not enter an intermediate space (Z) provided between the second component and the shaft body or between the second component and a third component non-rotatable connected to the shaft body,
   wherein the second component is surrounded during the chip-removing machining by a capsule in such a way that a cavity is provided between the second component and the capsule and an annular gap is provided between the capsule and the shaft body.

4. The method as claimed in claim 3, wherein the cavity has a fluid flowing through it from the inside to the outside during the chip-removing machining of the first component.

5. The method as claimed in claim 4, wherein the fluid for cooling the first component is used during the chip-removing machining process.

6. The method as claimed in claim 4, wherein the fluid is air, oil or a cooling liquid.

* * * * *